United States Patent [19]

Dozzi

[11] Patent Number: 4,632,953
[45] Date of Patent: Dec. 30, 1986

[54] SELF-EXTINGUISHING POLYCARBONATE COMPOSITION

[75] Inventor: Giovanni Dozzi, Montese, Italy

[73] Assignee: Enichem Polimeri S.p.A., Sassari, Italy

[21] Appl. No.: 835,541

[22] Filed: Mar. 3, 1986

[30] Foreign Application Priority Data

Mar. 12, 1985 [IT] Italy .................. 19862 A/85

[51] Int. Cl.$^4$ .................................. C08K 5/17
[52] U.S. Cl. ................. 524/239; 524/281; 524/371
[58] Field of Search ............ 524/281, 371, 239

[56] References Cited

U.S. PATENT DOCUMENTS 3,492,268  1/1970  Baker ........................... 525/462
4,486,540 12/1984  Thomas ......................... 524/281

FOREIGN PATENT DOCUMENTS 2909108  9/1980  Fed. Rep. of Germany .

Primary Examiner—Veronica P. Hoke

[57] ABSTRACT

Composition of self-extinguishing polycarbonate comprising, in mixture, a not halogenated aromatic polycarbonate and a mixture of additives conferring self-extinguishing characteristics to the same polycarbonate, formed by: (a) salt of alkaline metal, of alkaline-earth metal or of zinc, or mixed salt of said metals, of ethylenediaminotetraacetic acid; (b) oligomer of polycarbonate from tetrabromobisphenol-A terminated with phenol, or decabromodiphenyloxide; and (c) polytetrafluoroethylene.

4 Claims, No Drawings

SELF-EXTINGUISHING POLYCARBONATE COMPOSITION

The present invention relates to a self-extinguishing polycarbonate composition comprising, in mixture, a not halogenated aromatic polycarbonate and a mixture of additives conferring characteristics of self-extinguishment to same polycarbonate.

By "self-extinguishing polycarbonate composition" a composition is meant, according to the present invention, comprising, in mixture, a not-halogenated aromatic polycarbonate, and a mixture of additives conferring characteristics of self-extinguishment to same polycarbonate, said composition being classifiable as V-0 in behaviour relatively to fire, evaluated according to UNDERWRITERS' LABORATORIES, INC., BULLETIN 94, carried out on injection-moulded or compression-moulded test specimens having a thickness of from 1.6 to 3.2 mm.

The need is being more and more felt in the art of having available polymeric compositions provided with high self-extinguishment values, and that due to safety reasons. So, according to the known art, characteristics of self-extinguishment can be conferred to polycarbonate by bonding on to the polymeric chains thereof substantial amounts of halogen (especially chlorine and bromine), or blending polycarbonate (either halogenated or not) with additives capable of conferring said self-extinguishment characteristics. The additives normally used for that purpose are fluorinated polyolefins, metal salts of non aromatic and halogenated carboxy acids and metal salts of aromatic sulphonic acids. For that known art, reference is made in particular to the disclosures of U.S. Pat. Nos. 3,005,795, 3,673,278 and 4,391,935.

When a polycarbonate containing substantial amounts of halogen bonded to polymeric chains is used, the drawbacks substantially occur deriving from the impairing of polymer's physical-mechanical characteristics. On the other hand, it has been observed in practice that conferring high-extinguishment characteristics (V-0 according to the previously mentioned standard) with so small amounts of self-extinguishing additives as not to alter to a substantial extent said characteristics of polycarbonate, is extremely difficult.

It has been found now that it is possible to overcome the drawbacks of the known art by means of a particular mixture of self-extinguishing additives, capable of conferring characteristics of high flame resistance to polycarbonate, when used in amounts extremely reduced, and however lower than those causing undesirable changes in polymer properties.

Accordingly, the present invention relates to a composition of self-extinguishing polycarbonate comprising, in mixture, a straight or branched not halogenated aromatic polycarbonate, and a mixture of additives conferring characteristics of self-extinguishment to same polycarbonate, formed by: (a) salt of alkaline metal, of alkaline-earth metal or of zinc, or mixed salt of these metals, of ethylene-diaminotetraacetic acid; (b) phenol-terminated oligomer of polycarbonate from tetrabromobisphenol-A, or decabromodiphenyloxide; and (c) polytetrafluoroethylene; wherein additives (a), (b) and (c) are generally present in an amount of from 0.2 to 1.5 parts by weight per each 100 parts by weight of polycarbonate, the weight ratio of additive (b) to additive (a) varying within the range of from 1/1 to 16/1, the weight ratio of additive (c) to additive (a) varying within the range of from 0.5/1 to 6/1, and the composition showing moreover characteristics of self-extinguishment classifiable by a V-0 rating according to UNDERWRITERS' LABORATORIES, INC., BULLETIN 94.

The non halogenated aromatic polycarbonates to which self-extinguishing characteristics are conferred are those, known in the art, which are obtained by means of the polymerization of a diphenol with a carbonate percursor, e.g., phosgene. Polycarbonates from bisphenol A are preferred. Also aromatic compound with at least three functional groups can be used to yield branched polycarbonates. Polycarbonate can contain also other additives, such as pigments, thermo-oxidative stabilizers, lubricants, dyes, fillers, radiation absorbers, and so forth.

The additive (a) according to the present invention is a salt of alkaline metal, of alkaline-earth metal, of zinc, or preferably a mixed salt of such metals of ethylenediaminotetraacetic acid (EDTA). Specific examples of such additives are:

calcium and sodium salt of ethylenediaminotetraacetic acid (EDTA-Ca,Na$_2$);
barium and sodium salt of ethylenediaminotetraacetic acid (EDTA-Ba,Na$_2$);
zinc and potassium salt of ethylenediaminotetraacetic acid (EDTA Zn,K$_2$).

The additive (b) according to the present invention is a phenol-terminated oligomer of polycarbonate from tetrabromobisphenol-A, definable by means of following formula:

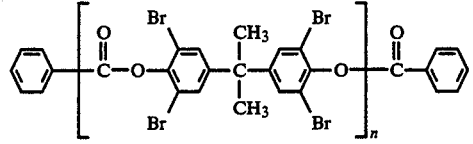

wherein n has an average value ranging from 3 to 6.

Alternatively, additive (b) of the present invention is decabromodiphenyloxide.

The additive (c) according to the present invention is polytetrafluoroethylene, of high molecular weight, and showing following physical characteristics: bulk density comprised within the range of from 300 to 950 g/l, and average particle size comprised within the range of from 0.5 to 600μ.

In the preferred practical embodiment of the present invention, additives (a), (b) and (c) are generally present in an amount ranging from 0.4 to 1.2 parts by weight per each 100 parts by weight of polycarbonate and the preferred weight ratios of additive (b) to additive (a) vary within the range of from 2/1 to 10/1, and those of additive (c) to additive (a) vary within the range of from 1/1 to 4/1.

The compositions of self-extinguishing polycarbonate according to the present invention are prepared by any means known in the art, and suitable to homogenize the additives with the polymer. In the preferred form of embodiment, the salt additives undergo a grinding up to reducing them to a powder with particle size of from 100μ to 0.5μ; the powder so obtained is mixed with polycarbonate and the mixture is submitted to an extrusion, a polycarbonate granulated and provided with characteristics of high flame resistance being obtained.

The self-extinguishing additives according to the present invention are commercial products, easily available from the market and of very low cost. The mixture of additives according to the present invention is capable to confer to polycarbonate characteristics of high flame resistance (with a V-0 rating according to the standard mentioned), when they are used in the global amounts and in the relative proportions which have been previously defined.

Under these conditions, the mixture of additives does not cause undesirable changes of the other characteristics typical of polycarbonate.

In the following experimental examples, a not halogenated aromatic polycarbonate is used, obtained from bisphenol A and phosgene, having the following characteristics: viscosimetric average molecular weight of about 35,000, with mechanical characteristics as indicated in Table 3, Example 1, and containing a white pigment of titanium dioxide which, as it is well known, acts negatively on behaviour of polycarbonate to flame.

The self-extinghishing additives and a white pigment of titanium dioxide are homogenized by milling on a RETSCH mill up to a powder with particle size of from 0.5 to $50\mu$, and the powder so obtained is mixed with polycarbonate. The mixture is introduced into an extruder heated at about 260° C. and the extrudate is cooled and granulated.

The granules are moulded both by compression (285° C.; 40 kg/cm$^2$), and by injection moulding (at about 300° C.), to obtain two types of specimens, and more precisely:

Specimen A: dimensions (127×12.7×3.2–1.6) mm
Specimen B: dimensions (127×6.5×3.2) mm Specimens A (five specimens for each of formulations reported in Table 1) are submitted to the test of behaviour to fire according UNDERWRITERS' LABORATORIES, INC., BULLETIN 94 (UL-94 standard). According to this Standard, the materials are classified as V-0; V-1; V-2, on the basis of the results, obtained with the five specimens, according to the following criterion:

V-0: None of specimens must show a combustion time longer than 10 seconds after the removal from the flame of a Bunsen burner. The total combustion time for the five specimens (ten ignitions) may not exceed 50 seconds.
None of specimens may let drop burning particles, igniting the surgical cotton positioned along the vertical under the specimen at the distance of 305 mm.

V-1: None of specimens must have a combustion time longer than 3 seconds after the removal from the flame of a Bunsen burner. The total combustion time for the five specimens (ten ignitions) may not exceed 250 seconds.
None of specimens may let drop burning particles, igniting the surgical cotton positioned along the vertical under the specimen at the distance of 305 mm.

V-2: None of specimens must have a combustion time longer than 30 seconds after the removal from the flame of a Bunsen burner. The total combustion time for the five specimens (ten ignitions) may not exceed 250 seconds.
The specimens may let drop burning particles igniting the surgical cotton positioned along the vertical under the specimen at the distance of 305 mm.
Moreover, all the five specimens must pass the test according to UL-94 Standard, otherwise they are given a rating on the basis of the behaviour of the worst specimen. If, for instance, a specimen shows a V-2 behaviour and the other four specimens show a V-0 behaviour, all five specimens are given a rating V-2. Finally, if a specimen continues burning over more than 30 seconds after having been removed from the flame of a Bunsen burner, it does not receive a rating according to UL-94 Standard, but is reported as burning specimen.

Specimens B are submitted to the test of behaviour to fire according to ASTMD2863-77 Standard, which correlates the flammability of a polymeric material with the concentration of oxygen present in the atmosphere under which the same specimen is. This correlation is expressed as LOI (Limiting Oxygen Index), i.e., as the minimum oxygen percentage capable of maintaining the combustion of the specimen under an oxygen-nitrogen atmosphere impinging against the same specimen by flowing from down upwards.

The value is moreover determined of Melt Flow Index (MFI) at 300° C. and under 1.2 kg on extruded granulate and on said granulate kept at 300° C. for 60 minutes. On the basis of these values, the thermal stability, as expressed by:

$$\text{Thermal stability:} \frac{MFI(t = 60') - MFI(t = 0)}{MFI(t = 0)} \cdot 100$$

is determined.

Other characteristics which are determined are the White Index (ASTM D 313 Standard) and the values of Flexural characteristics (Maximum Load or Modulus in MPa) (ASTM D 790 Standard).

In Table 1 the compositions of self-extinguishing polycarbonate according to the present invention (Examples 7–11) are reported together with comparison compositions (examples 1–6).

The amount of additives is reported as amount by weight per 100 parts by weight of polycarbonate.

In this Table the following abbreviations are used:
For additive (a):
EDTA-Ca,Na$_2$=calcium and sodium salt of ethylenediaminotetraacetic acid;
EDTA-Ba,Na$_2$=barium and sodium salt of ethylenediaminotetraacetic acid;
EDTA-Zn,K$_2$=zinc and potassium salt of ethylenediaminotetraacetic acid;
For additive (b):
OPTA=phenol-terminated oligomer of polycarbonate of tetrabromobisphenol A, definable by the formula:

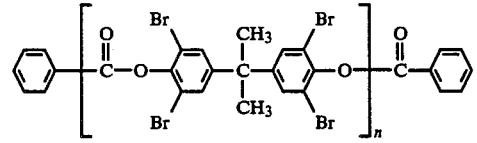

with n having an average value of about 4.5.
DBDO=decabromodiphenyloxide.
For additive (c):
PTFE=Commercial product "Algoflon" ® from Montefluos company, having the following characteristics: bulk density of about 400 g/l and average particle diameter of about $20\mu$.

In Table 2 the characteristics of behaviour to fire (UL-94 Standards) of compositions of Table 1 are reported.

In Table 3 the values are reported of LOI(%); MFI(g/10') at 300° C. and under 1.2 kg; Heat stability (as hereinabove defined); White Index; and Flexural Strength (Maximum Load and Modulus), in MPa.

On examining the Tables, the effects on polycarbonate's behaviour to flame of the mixture of additives according to the invention appear unexpectedly favourable, in particular if they are compared to the efficacy of the individual additives and of couples of same additives. Moreover, no noticeable differences are observed between the mechanical properties of polymer as such, and same polymer with the additives.

TABLE 1

| Example N. | Polycarbonate (parts by weight) | Mixture of additives | | |
|---|---|---|---|---|
| | | Additive (a) (parts by weight) | Additive (b) (parts by weight) | Additive (c) (parts by weight) |
| 1 | 100 | — | — | — |
| 2 | 100 | EDTA-Ca, Na$_2$ (0.1) | — | — |
| 3 | 100 | — | OPTA (0.8) | — |
| 4 | 100 | — | — | PTFE (0,1) |
| 5 | 100 | EDTA-Ca, Na$_2$ (0.1) | — | PTFE (0.1) |
| 6 | 100 | — | OPTA (0.8) | PTFE (0.1) |
| 7 | 100 | EDTA-Ca, Na$_2$ (0.1) | OPTA (0.8) | PTFE (0.1) |
| 8 | 100 | EDTA-Ca, Na$_2$ (0.075) | OPTA (0.6) | PTFE (0.075) |
| 9 | 100 | EDTA-Ca, Na$_2$ (0.1) | OPTA (0.3) | PTFE (0.3) |
| 10 | 100 | EDTA-Ba, Na$_2$ (0.1) | DBDO (0.5) | PTFE (0.1) |
| 11 | 100 | EDTA-Zn, K$_2$ (0.1) | DBDO (0.2) | PTFE (0.3) |

TABLE 2

| Example N. | Total combustion time of 5 specimens (10 ignitions) (seconds) | Longest combustion time per specimen (2 ignitions) (seconds) | Number of burning drops per 5 specimens which ignite the cotton (seconds) | UL-94 Rating | | |
|---|---|---|---|---|---|---|
| | | | | 3.2 mm | 2.4 mm | 1.6 mm |
| 1 | 287 | 68 | 8 | burns | — | — |
| 2 | 102 | 25 | 2 | V-2 | V-2 | — |
| 3 | 254 | 63 | 8 | burns | — | — |
| 4 | 325 | 107 | 2 | burns | burns | — |
| 5 | 73 | 19 | 0 | V-1 | V-2 | — |
| 6 | 194 | 64 | 1 | burns | burns | — |
| 7 | 20 | 5 | 0 | V-0 | V-0 | V-0 |
| 8 | 24 | 6 | 0 | V-0 | V-0 | V-0 |
| 9 | 16 | 4 | 0 | V-0 | V-0 | V-0 |
| 10 | 24 | 6 | 0 | V-0 | V-0 | V-0 |
| 11 | 22 | 5 | 0 | V-0 | V-0 | V-0 |

TABLE 3

| Example N. | LOI (%) | MFI (300° C./1.2 kg) (g/10') | Thermal Stability | White Index | Flexural properties | |
|---|---|---|---|---|---|---|
| | | | | | Maximum Load (MPa) | Modulus (MPa) |
| 1 | 26 | 5.6 | 46 | 62.2 | 91.6 | 2255 |
| 2 | 35 | 6.1 | 18 | 63.2 | 94.3 | 2321 |
| 3 | 26 | 5.8 | 44 | 61.4 | 95.2 | 2281 |
| 4 | 28 | 5.2 | 54 | 61.9 | 94.8 | 2296 |
| 5 | 37 | 6.0 | 25 | 63.0 | 93.9 | 2244 |
| 6 | 30 | 5.5 | 46 | 59.0 | 94.8 | 2297 |
| 7 | 40 | 5.4 | 34 | 62.0 | 94.0 | 2270 |
| 8 | 38 | 5.3 | 20 | 62.5 | 94.3 | 2268 |
| 9 | 40 | 5.1 | 31 | 62.9 | 94.3 | 2257 |
| 10 | 38 | 5.8 | 35 | 61.5 | 93.5 | 2272 |
| 11 | 37 | 5.2 | 30 | 62.6 | 94.2 | 2264 |

I claim:

1. Composition of self-extinguishing polycarbonate comprising, in mixture, a non halogenated aromatic polycarbonate, and a mixture of additives conferring self-extinguishment characteristics to said polycarbonate, formed by: (a) a salt of alkaline metal, of alkaline-earth metal or of zinc, or mixed salt of these metals, of ethylene-diaminotetraacetic acid; (b) a phenol-terminated oligomer of polycarbonate from tetrabromobisphenol-A, or decabromo-diphenyl oxide; and (c) polytetrafluoroethylene; wherein additives (a), (b) and (c) are present in amounts of from 0.2 to 1.5 parts by weight per each 100 parts by weight of polycarbonate, the weight ratio of additive (b) to additive (a) varying within the range of from 1/1 to 16/1, and the weight ratio of additive (c) to additive (a) varying within the range of from 0.5/1 to 6/1.

2. Composition according to claim 1, characterized in that non halogenated aromatic polycarbonate is a polycarbonate of bisphenol A.

3. Composition according to claim 1, characterized in that additive (a) is a mixed salt of calcium and sodium, or of barium and sodium, or of zinc and potassium of ethylenediaminotetraacetic acid.

4. Composition according to claim 1, characterized in that it contains additives (a), (b) and (c) in an amount ranging from 0.4 to 1.2 parts by weight per each 100 parts by weight of polycarbonate, the weight ratio of additive (b) to additive (a) varying within the range of from 2/1 to 10/1, and the weight ratio of additive (c) to additive (a) varying within the range of from 1/1 to 4/1.

* * * * *